(12) United States Patent
Tatsukami et al.

(10) Patent No.: US 7,440,267 B2
(45) Date of Patent: Oct. 21, 2008

(54) ELECTRONIC APPARATUS

(75) Inventors: Ikki Tatsukami, Kawasaki (JP); Minoru Kumagai, Kawasaki (JP); Yutaka Satou, Kawasaki (JP); Takashi Iijima, Kawasaki (JP); Tadashi Kikkawa, Shimane (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 11/268,665

(22) Filed: Nov. 8, 2005

(65) Prior Publication Data
US 2006/0056144 A1    Mar. 16, 2006

Related U.S. Application Data

(63) Continuation of application No. PCT/JP03/05880, filed on May 12, 2003.

(51) Int. Cl.
*H05K 5/00* (2006.01)

(52) U.S. Cl. .............. 361/683; 312/223.1; 345/169; 455/575.1

(58) Field of Classification Search ... 312/223.1–223.6; 361/679–687, 724–727; 345/169; 349/58; 455/575.1
See application file for complete search history.

(56) References Cited

U.S. PATENT DOCUMENTS 5,867,148 A * 2/1999 Kamimaki et al. .......... 345/169
6,504,529 B1   1/2003 Inagaki et al.
2006/0152898 A1 * 7/2006 Hirayama .................. 361/683
2007/0081304 A1 * 4/2007 Takeguchi .................. 361/683

FOREIGN PATENT DOCUMENTS

| CN | 2391240 Y | 8/2000 |
|---|---|---|
| JP | 09-148757 | 6/1997 |
| JP | 10-011189 | 1/1998 |
| JP | 10-339008 | 12/1998 |
| JP | 11-134079 | 5/1999 |
| JP | 11-212665 | 8/1999 |
| JP | 2001-142564 | 5/2001 |
| JP | 2001-175356 A | 6/2001 |
| JP | 2002-006987 | 1/2002 |
| JP | 2002-132385 | 5/2002 |
| JP | 2002-182784 | 6/2002 |
| JP | 2002-374434 | 12/2002 |
| JP | 2003-44166 | 2/2003 |

OTHER PUBLICATIONS

Sony Personal Computer VAIO Catalogue, Jan. 2003, Extract.
Office Action dated Mar. 2, 2007 issued in corresponding Chinese Application No. 038264439.

* cited by examiner

*Primary Examiner*—Hung V Duong
(74) *Attorney, Agent, or Firm*—Westerman, Hattori, Daniels & Adrian, LLP.

(57) ABSTRACT

The present invention relates to various types of electronic apparatus having a folding structure via hinges and aims to help further enrich and compact functions. The apparatus includes: a first enclosure having a circuit component; a hinge unit rotatably connected to the first enclosure via a hinge; and a second enclosure having a circuit component and connected to the first enclosure via the hinge unit, in which the hinge unit has a circuit component.

11 Claims, 18 Drawing Sheets

ELECTRONIC APPARATUS

TECHNICAL FIELD

The present invention relates to an electronic apparatus such as a personal computer.

BACKGROUND ART

Conventionally, various types of electronic apparatus have been developed and become widespread. As an example of such devices, personal computers (hereinafter refer to as "PC") having a data processing function will be described here.

In addition to desktop PCs, notebook PCs are widely used as PCs. The desktop PCs are each composed of: a main unit performing data processing, which is equipped with a CPU, a hard disk, etc.; an image display unit having a screen for displaying images; and a keyboard used for key operation, which are disposed in separate respective housings. The notebook PCs are portable and each composed of: an image display unit having a display screen; and a main unit having a CPU performing data processing, a hard disk for storing information, and the like incorporated therein, and having arrayed keys on the top to serve also as a keyboard. The image display unit and the main unit of the notebook PCs are connected via hinges.

The notebook PCs can be folded in two by superposing the image display unit on the main unit via hinges and thus it is convenient to carry. In addition, the notebook PCs can be unfolded by making the image display unit and the main unit open with respect to each other so that a user can operate keys while looking at the display screen, and thus it has excellent operability.

Because importance is placed on portability and thin structure in a folded state, the performance of the notebook PCs is considerably sacrificed in terms of functions compared to the desktop PCs. In addition, because the notebook PCs are usually used like a desktop PC in many cases, i.e. they are placed on a desk and used without being carried, integral-type PCs having full functions and portability to some extent have come along in recent years although their portability is not as high as that of notebook PCs. Typically, the integral-type PCs are each composed of: a base section to be placed on a flat surface like the top of a desk; a standing section standing on and supported by the base section and having a display screen; and a keyboard attached to the standing section via hinges and openable and closable with respect to the standing section. When not in use, the keyboard of the integral-type PCs can be made stood against the standing section in such a manner as to be superposed on the standing section, so that space on the desk can be obtained. In addition, the integral-type PCs are easy to carry because they are integrally configured.

Many of such notebook PCs and integral-type PCs have hinges as described above, and it is ensured that these computers are housed in a compact manner when not in use and that they are convenient to carry (refer to Patent Documents 1 and 2, for example).

(Patent Document 1)
Japanese Patent Application Publication No. 10-11189
(Patent Document 2)
Japanese Patent Application Publication No. 11-212665

For notebook PCs as well as integral-type PCs, how their functions should be packed to reduce the size and weight is extremely important, which is a common issue to various kinds of apparatus.

In view of the above circumstances, an object of the present invention is to provide an electronic apparatus having a structure that helps to upgrade and compact the functions.

DISCLOSURE OF THE INVENTION

An electronic apparatus of the present invention which achieves the above object is an electronic apparatus having:
a first enclosure having a circuit component;
a hinge unit rotatably connected to the first enclosure via a hinge; and
a second enclosure having a circuit component and connected to the first enclosure via the hinge unit,
wherein the hinge unit has a circuit component.

Conventionally, for a component forming a hinge, only the function of opening and closing the first and second enclosures of the present invention is considered. On the other hand, the feature of the present invention lies in that the hinge is unitized and includes a circuit component, which makes the functions to be more compact or helps further enrich the functions.

Here, in the above electronic apparatus of the present invention, preferably, the first enclosure may have a display section having a display screen for displaying an image, and
the second enclosure may be a keyboard having arrayed keys to be operated by an operator. In this aspect, preferably, the hinge unit is rotatable between a closed position in which the keyboard is superposed on the display screen and an open position in which the keyboard is opened with respect to the display screen.

Further, the hinge unit may include a circuit board having a circuit component thereon, include an operation member as a circuit component, or include both of them.

Furthermore, preferably, the keyboard is detachably attached to the hinge unit. In this aspect, the keyboard preferably includes a wireless communication section for wirelessly communicating with the display section.

Still further, when the electronic apparatus has a first detection section that detects opening and closing of the hinge unit, processing can be performed according to opening and closing of the hinge unit. When the electronic apparatus has a second detection section that detects attachment and detachment of the keyboard to and from the hinge unit, processing can be performed according to attachment and detachment of the hinge unit.

For example, the electronic apparatus may be configured such that the keyboard is detachably attached to the hinge unit and covers a part of the display screen when the hinge unit is in a closed position, and
the electronic apparatus further has:
a first detection section that detects opening and closing of the hinge unit;
a second detection section that detects attachment and detachment of the keyboard to and from the hinge unit; and
a display control section that changes display contents by changing between an open-screen state in which the hinge unit is in an open position or the keyboard is detached from the hinge unit, and a covered-screen state in which the keyboard is attached to the hinge unit and the hinge unit is in a closed position.

Still furthermore, in the above electronic apparatus of the present invention, the second enclosure may be a keyboard having arrayed keys to be operated by an operator, and the first enclosure maybe a main unit that performs data processing according to an operation made on the keyboard.

In this aspect, preferably, the hinge unit is rotatable between a closed position in which the keyboard is superposed on the main unit and an open position in which the keyboard is opened with respect to the main unit. More preferably, the keyboard is detachably attached to the hinge unit and includes a wireless communication section for wirelessly communicating with the display section.

It is also preferable that the electronic apparatus has a first detection section that detects opening and closing of the hinge unit and a second detection section that detects attachment and detachment of the keyboard to and from the hinge unit.

BEST MODE FOR CARRYING OUT THE INVENTION

An embodiment of the present invention will be described below.

Descriptions will be given here of the above-described integral-type PC as an embodiment of the electronic apparatus of the present invention.

Figure 1:
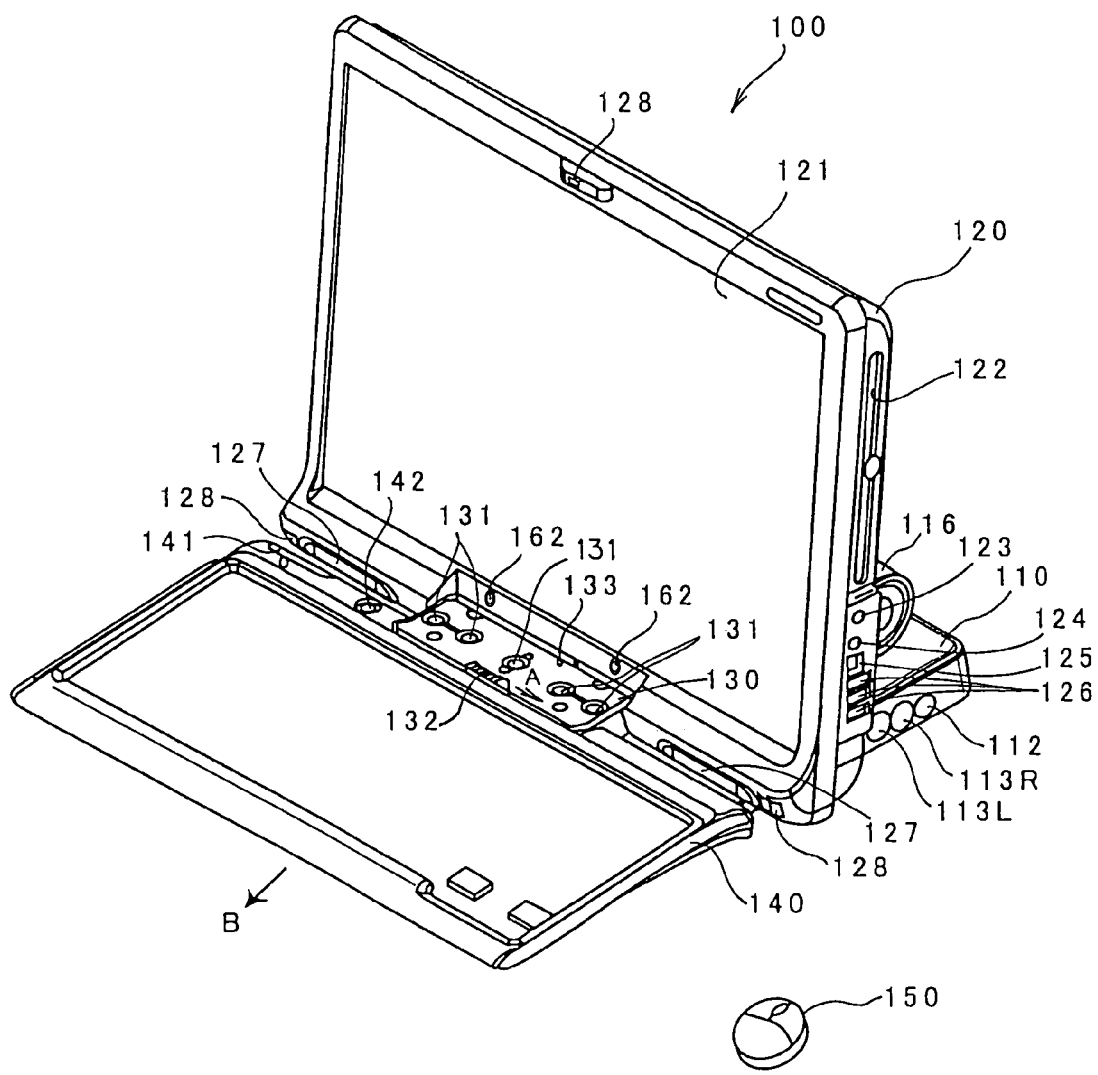
FIG. 1 is a perspective view of the appearance of an integral-type PC as an embodiment of the electronic apparatus of the present invention in an open position.
Figure 2:
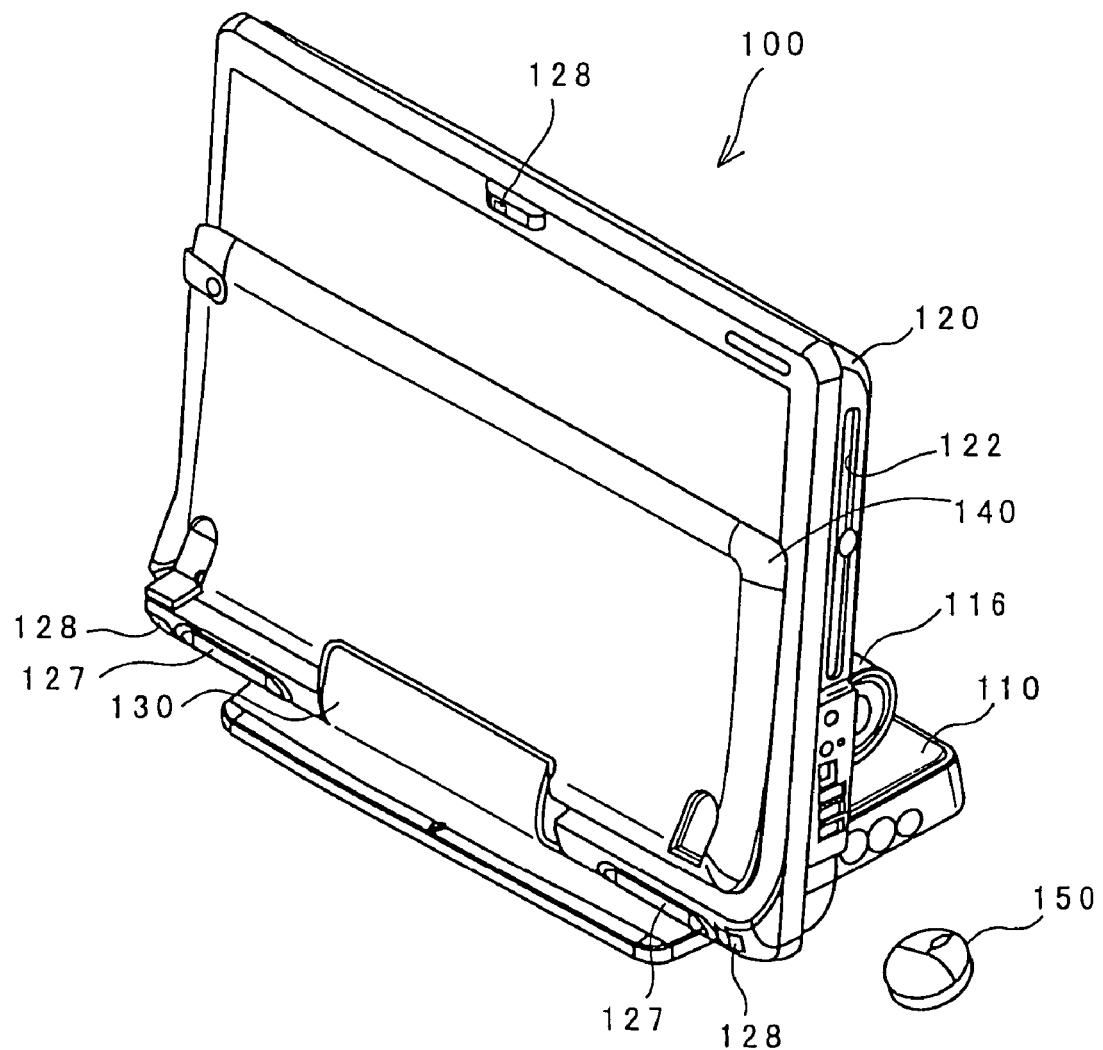
FIG. 2 is a perspective view of the appearance of an integral-type PC as an embodiment of the electronic apparatus of the present invention in a closed position.

FIGS. 1 and 2 are perspective views showing the appearance of an integral-type PC as an embodiment of the electronic apparatus of the present invention, in an open position and a closed position, respectively.

This integral-type PC 100 is composed of a base section 110, a standing section 120, a hinge unit 130, a keyboard 140, and a mouse 150.

Figure 15:
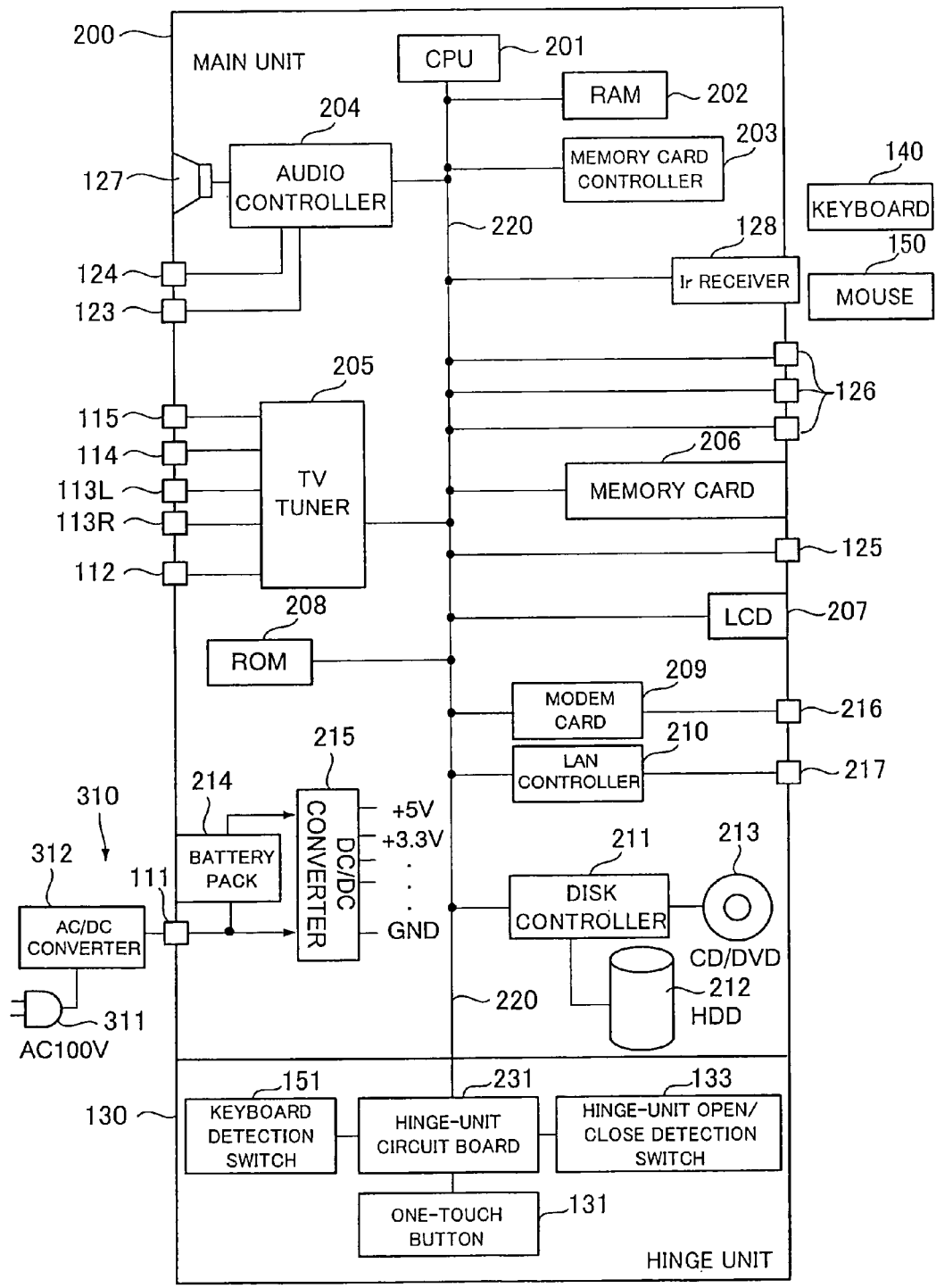
FIG. 15 is a circuit block diagram of the integral-type PC.

The base section 110 is a portion that becomes a base to be placed on a horizontal surface like the top of a desk etc. The base section 110 is equipped with a battery pack to be loaded (not shown). As shown in FIG. 15, the base section 110 includes an AC adapter connection terminal 111, an antenna input terminal 112 connected to a TV antenna, audio input terminals 113R and 113L, an S video input terminal 114, and a video input terminal 115. Furthermore, a woofer 116 is provided in an upper part of the base section 110.

The standing section 120 is, as illustrated, supported on the base section 110 in a standing manner, and has a liquid crystal display screen 121 in the front thereof. The shaft of the standing section 120 is rotatably supported on the base section 110 to permit rotation through a certain angle so that an elevation angle of the liquid crystal display screen 121 can be adjusted. Also, the standing section 120 is equipped with a principal part of data processing to function as a computer, such as a CPU and a hard disk, on the back surface side of the display screen 121. What is externally shown in FIG. 1 includes a CD/DVD loading slot 122 through which a CD and a DVD are loaded, a headphone output terminal 123 into which a headphone jack is inserted, a microphone input terminal 124 into which a microphone jack is inserted, a connector terminal 125 into which the connector of a communication cable which conforms to IEEE 1394 communication standard is inserted, three connector terminals 126 into which the connectors of communication cables in conformance with USB communication standard are inserted, two right and left speakers 127, and a total of three infrared receivers 128, one each in the right and left lower parts and one in the upper part. These infrared receivers 128 receive infrared rays for communication, which are emitted from the keyboard 140 and the mouse 150, which will be described later.

The hinge unit 130 includes five one-touch buttons 131, and the hinge unit 130 incorporates a circuit board on which circuits for detecting the operations of these one-touch buttons 131 and transmitting them to the standing section are loaded.

Functions, such as startup of an Internet program upon depressing of a certain one-touch button, can be respectively allocated to these five one-touch buttons 131.

The hinge unit 130 removably supports the keyboard 140, and the hinge unit 130 is equipped with a detachment operation button 132 used to detach the keyboard 140 attached to the hinge unit 130 from the hinge unit 130.

Figure 3:
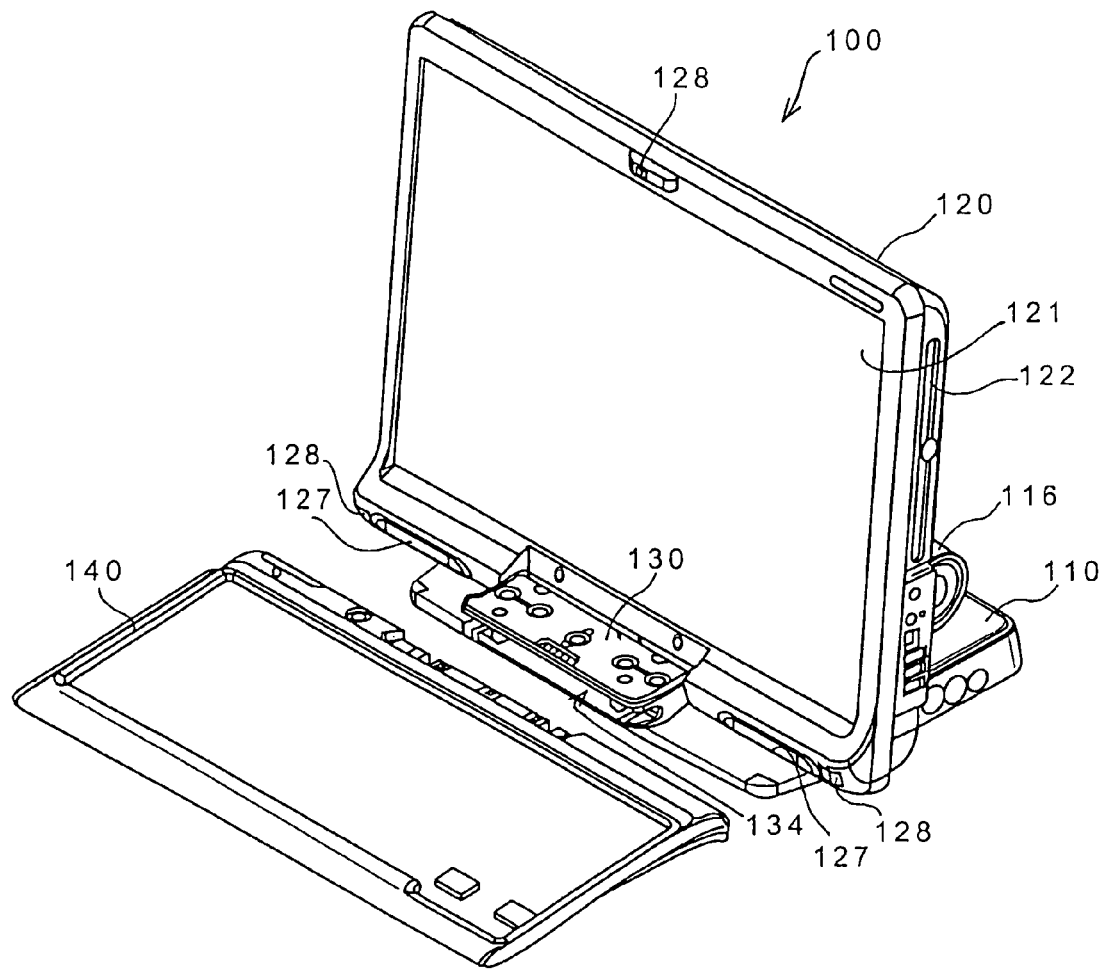
FIG. 3 is a perspective view of a keyboard detached from a hinge unit.

FIG. 3 is a perspective view of the keyboard 140 detached from the hinge unit 130.

A keyboard biting slit 134, which extends right and left and bites the keyboard 140, is formed in the hinge unit 130 as shown in FIG. 3. When the keyboard 140 in the posture as shown in FIG. 3 is fitted into the keyboard biting slit 134 of the hinge unit 130, the keyboard 140 becomes attached to the hinge unit 130 as shown in FIG. 1. When the detachment operation button 132 is slid in the direction of an arrow A shown in FIG. 1, the engagement between the keyboard 140 and the hinge unit 130 is released and the keyboard 140 is detached from the hinge unit 130 as shown in FIG. 3 by drawing the keyboard 140 in the direction of an arrow B shown in FIG. 1.

Figure 4:
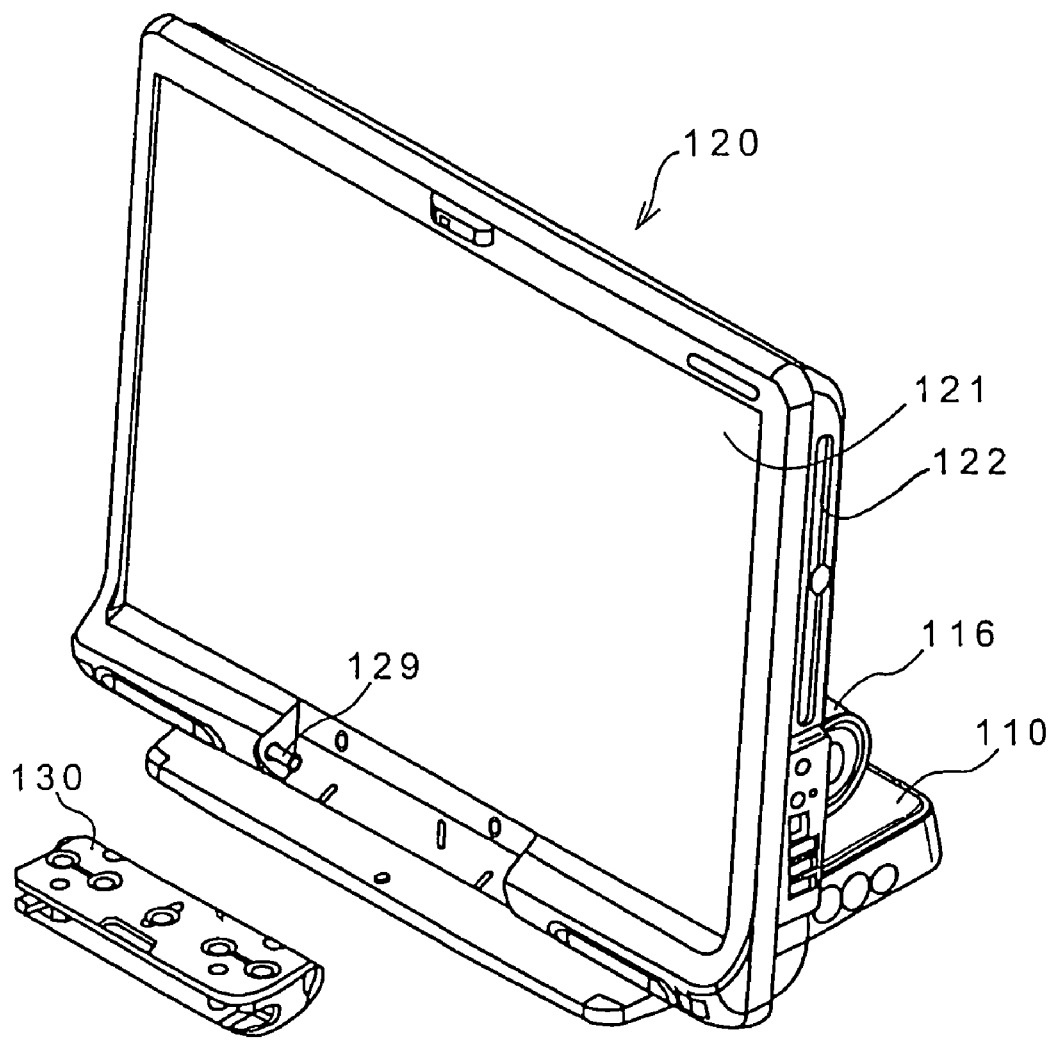
FIG. 4 is a perspective view of the hinge unit removed from a standing section.

FIG. 4 is a perspective view of the hinge unit removed from the standing section.

The hinge unit 130 is rotatably supported by a supporting shaft 129 provided in the standing section 120 and can rotate on the supporting shaft 129 to ensure that the keyboard 140 attached to the hinge unit 130 can rotate between a closed position in which the keyboard 140 is superposed on the standing section 120 to cover the liquid crystal display screen 121 as shown in FIG. 2, and an open position in which the keyboard 140 opens with respect to the standing section 120 to expose the whole area of the liquid crystal display screen 121 as shown in FIG. 1.

The hinge unit 130 has a hinge-unit open/close detection switch 133 (refer to FIGS. 1 and 14), which detects whether the hinge unit 130 is in an open position shown in FIG. 1 or in a closed position shown in FIG. 2, and also has a keyboard detection switch 151 (refer to FIG. 13), which detects whether the keyboard 140 is attached to the hinge unit 130 as shown in FIG. 1 or the keyboard 140 is detached from the hinge unit 130 as shown in FIG. 3. In the circuit on the circuit board incorporated in the hinge unit 130, in addition to the depression of the five one-touch buttons 131, the on/off operations of the hinge unit open/close detection switch 133 and the keyboard detection switch 151 are also detected.

Incidentally, the standing section 120 has receiving sections 162 (FIG. 1) formed from an elastic body such as rubber. The receiving sections 162 flexibly receive the abutment by the hinge unit 130 when the integral-type PC is folded double as shown in FIG. 2.

A number of keys (not shown) which receive key operations are arranged on the keyboard 140. In addition, the keyboard 140 has an infrared transmitter 141 which sends key operation information and a suspend button 142 to wake this integral-type PC 100 from suspend mode. Key operation information sent from the infrared transmitter 141 of the keyboard 140 is received by an infrared receiver 128 provided in the standing section 120.

The mouse 150 also has an infrared transmitter (not shown here) which sends operation information of the mouse 150, and the mouse operation information sent from this infrared transmitter is also received by the infrared receiver 128 of the standing section 120.

The keyboard 140 has a width (in the horizontal direction) almost equal to the standing section 120, but has a shorter depth as shown in FIG. 1 (the vertical direction in the closed position shown in FIG. 2) than the standing section 120. For this reason, in the closed position shown in FIG. 2, the keyboard 140 covers only part of the display screen 121 of the standing section 120, and even in the closed position shown in FIG. 2, part of the upper portion of the display screen 121— i.e. about ⅓ portion of the display screen 121 remains exposed.

Figure 5:
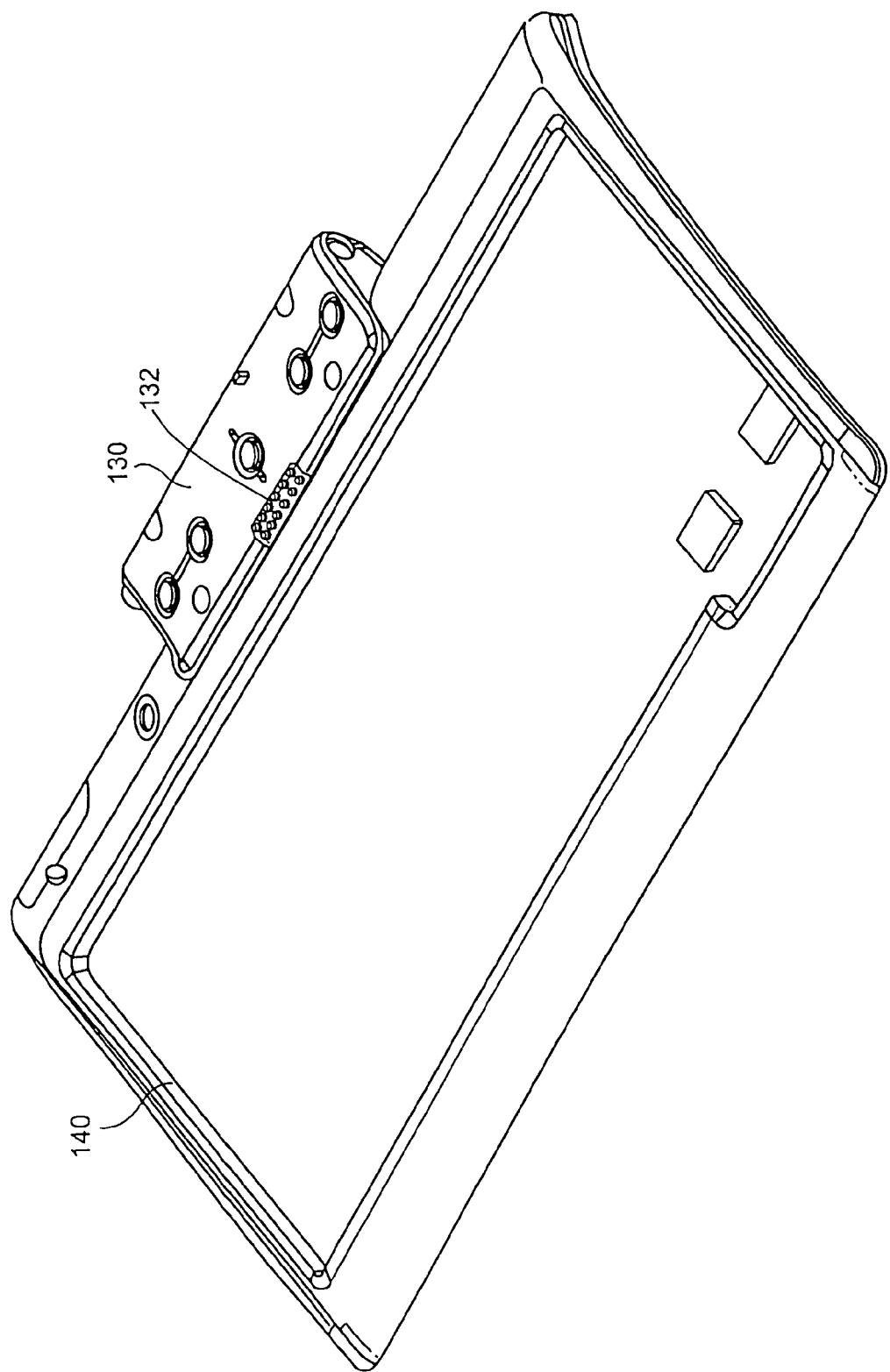
FIG. 5 is a perspective view of the hinge unit and the keyboard attached to the hinge unit.
Figure 6:
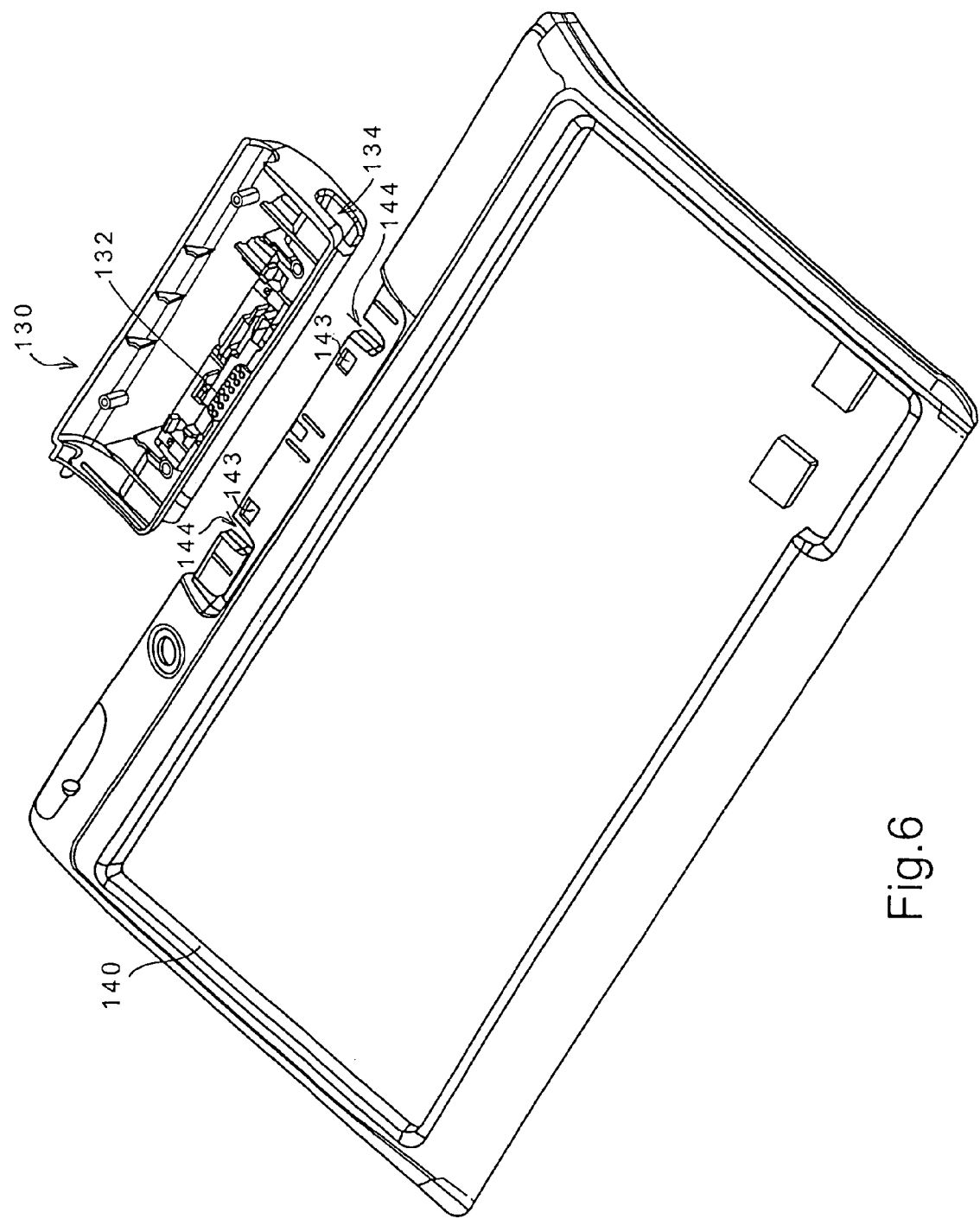
FIG. 6 is a perspective view of the internal structure of the hinge unit whose cover is removed and the keyboard detached from the hinge unit.
Figure 7:
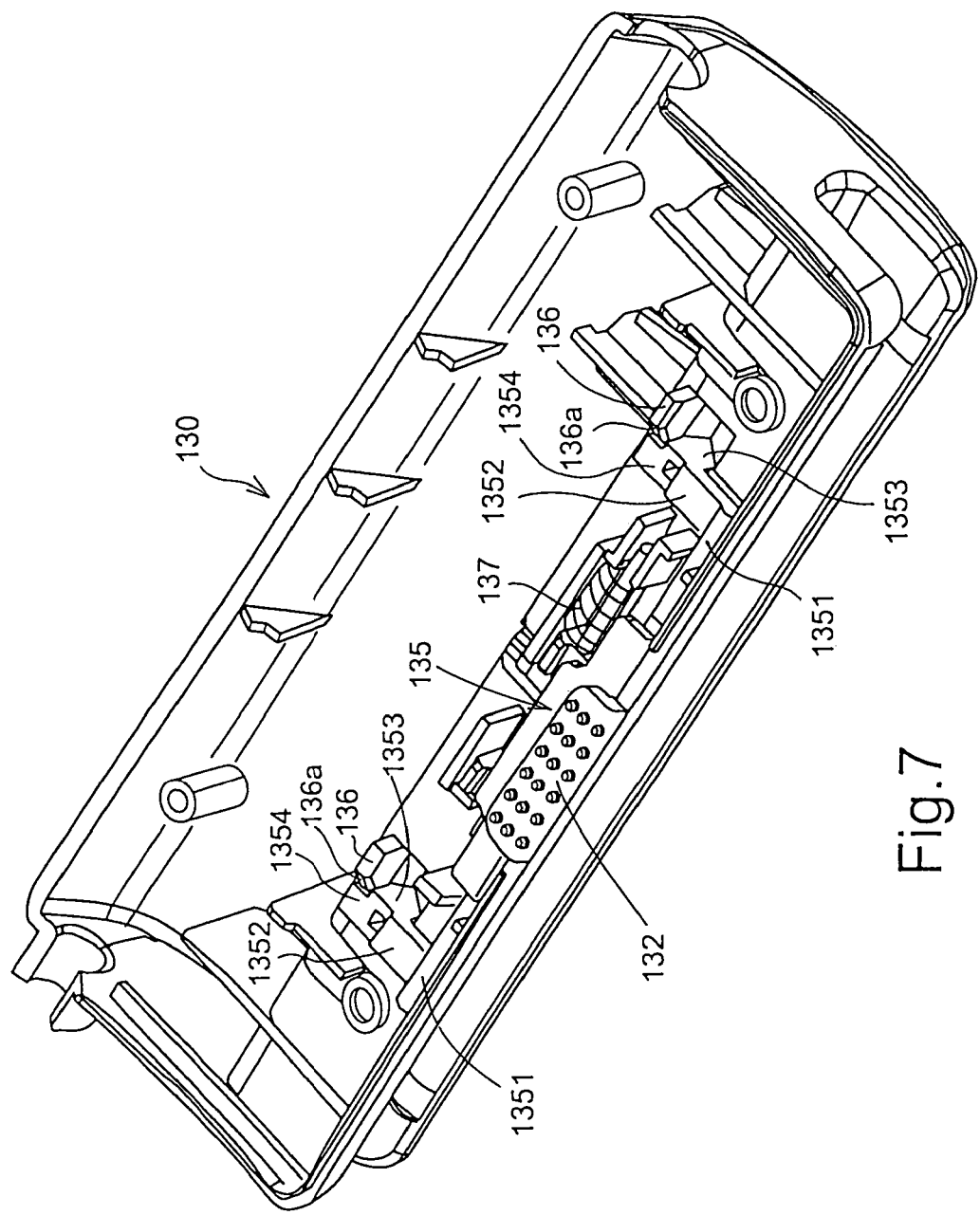
FIG. 7 is an enlarged view of the internal structure of the hinge unit shown in FIG. 6.
Figure 8:
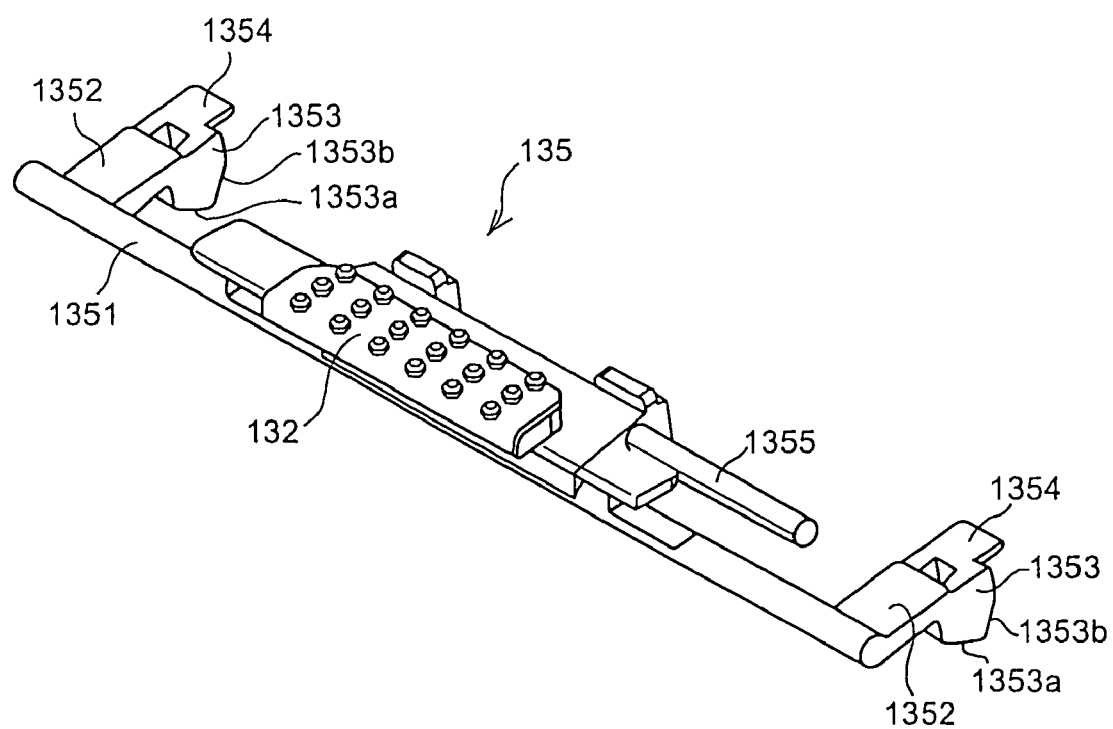
FIG. 8 is a perspective view of a hook part disposed in the hinge unit.

Next, the attachment/detachment mechanism of the hinge unit 130 and the keyboard 140 will be described FIG. 5 is a perspective view of the hinge unit and the keyboard attached to the hinge unit. FIG. 6 is a perspective view of the internal structure of the hinge unit whose cover is removed and the keyboard detached from the hinge unit. FIG. 7 is an enlarged view of the internal structure of the hinge unit shown in FIG. 6. FIG. 8 is a perspective view of a hook part disposed in the hinge unit.

As shown in FIG. 6, the keyboard 140 has two engagement concaves 143 and two guiding indentations 144 used for guiding at the time of attachment. On the other hand, the hinge unit 130 has a hook part 135 shown in FIG. 8 composed of the detachment operation button 132; a shaft 1351 to which the detachment operation button 132 is integrally fixed; plates 1352 extending from both ends of the shaft 1351 towards the back of the keyboard biting slit 134 shown in FIG. 6; hooks 1353 protruding downward from the tips of the plates 1352; projections 1354 adjacent to the hooks 1353 and to be disposed on motion guides 136 (see FIG. 7); and a rod 1355 to be inserted into a coil spring 137 (see FIG. 7).

The hooks 1353 each have tapered surfaces 1353a and 1353b formed on the front and back in the direction towards the back of the keyboard biting slit 134 shown in FIG. 6 (in the attachment direction of the keyboard 140), respectively and also have an edge pointed downward. The edge of each hook 1353 protrudes to a point where it enters the corresponding engagement concave 143 of the keyboard 140 shown in FIG. 6 when the keyboard 140 is attached. Of the tapered surfaces 1353a and 1353b formed in the hook 1353, the tapered surface 1353a, which is closer to the front side of the biting slit 134 (see FIG. 6, in the keyboard 140 side shown in FIG. 6), is closer to horizontal than the tapered surface 1353b. This is intended for easily accepting the keyboard 140 when it is attached. In contrast, the tapered surface 1353b is close to vertical in order to prevent the keyboard 140 from being accidentally detached once it is attached.

Also, the hinge unit 130 has two posts 138 (see FIG. 9) to enter the guiding indentations 144 of the keyboard 140 when the keyboard 140 is attached to the biting slit 134.

The coil spring 137 shown in FIG. 7 urges the hook part 135 in the left direction of FIG. 7 so that the hooks 1353 of the hook part 135 can enter the engagement concaves 143 of the attached keyboard 140 at leftward positions to which they are moved by such an urge.

Next, the process of attachment and detachment of the keyboard by the above mechanism will be described.

Figure 9:
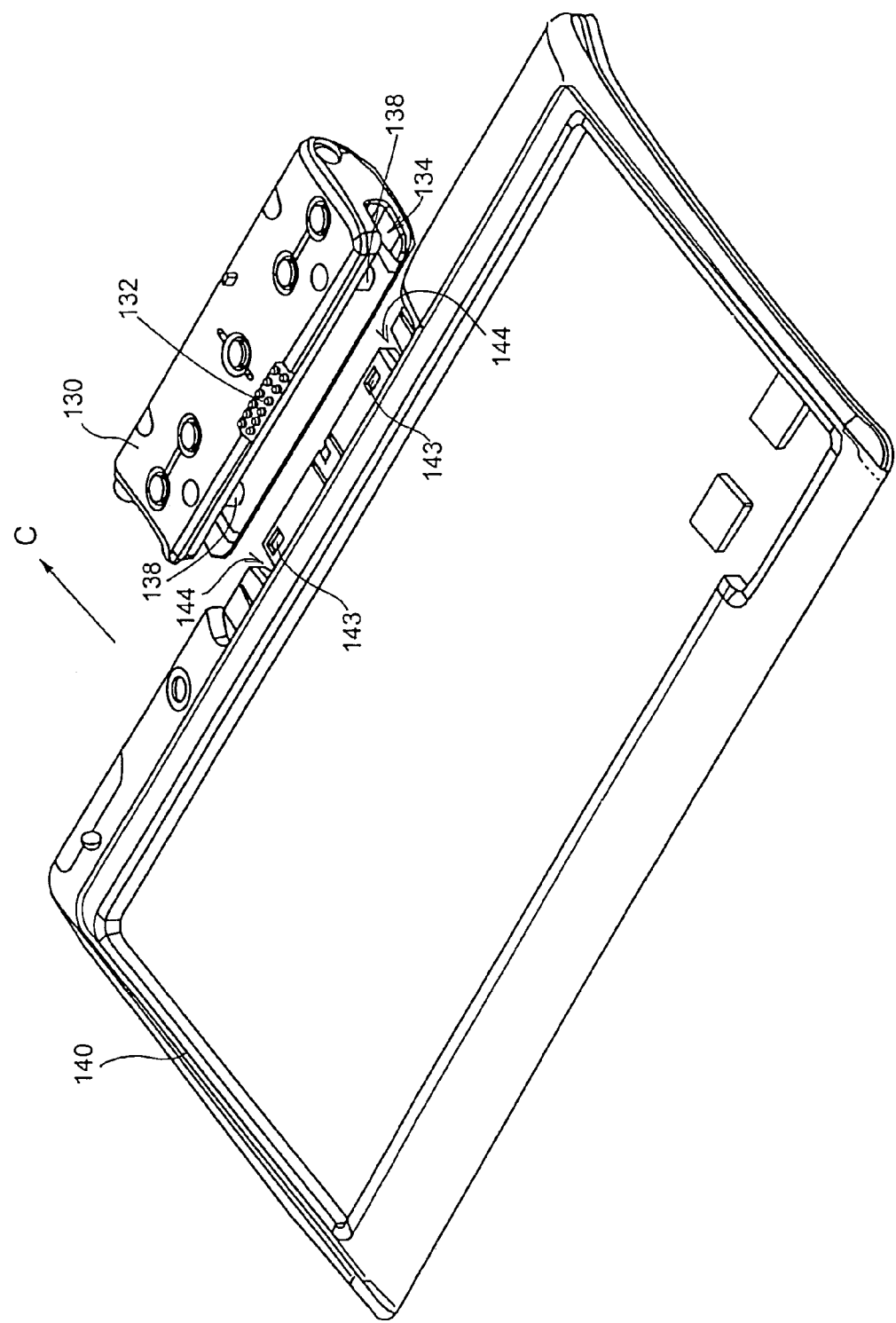
FIG. 9 is a perspective view of the hinge unit and the keyboard before being attached to the hinge unit.
Figure 10:
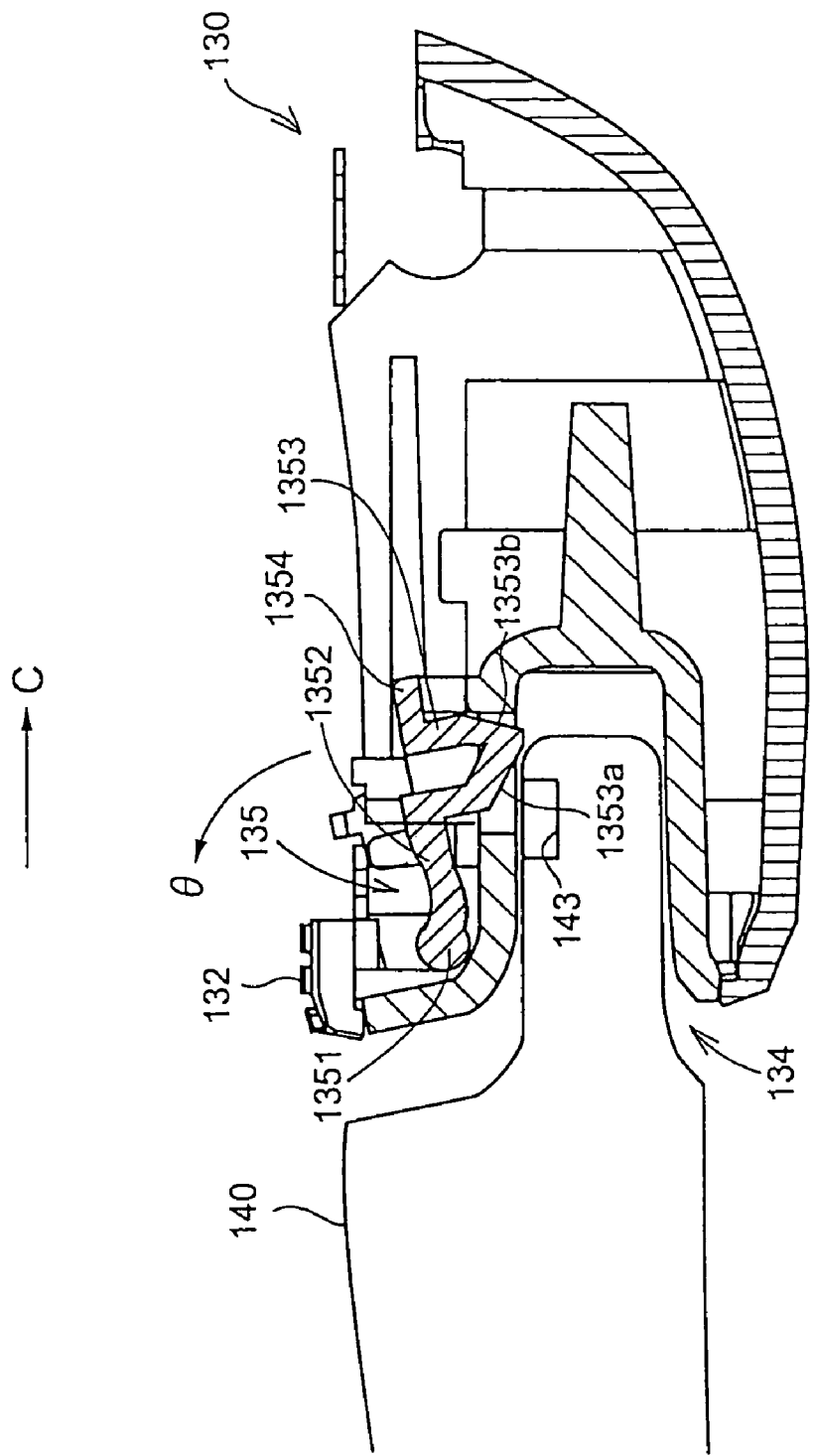
FIG. 10 is a cross-sectional view of the keyboard taken in the attachment direction when it is attached in partway.
Figure 11:
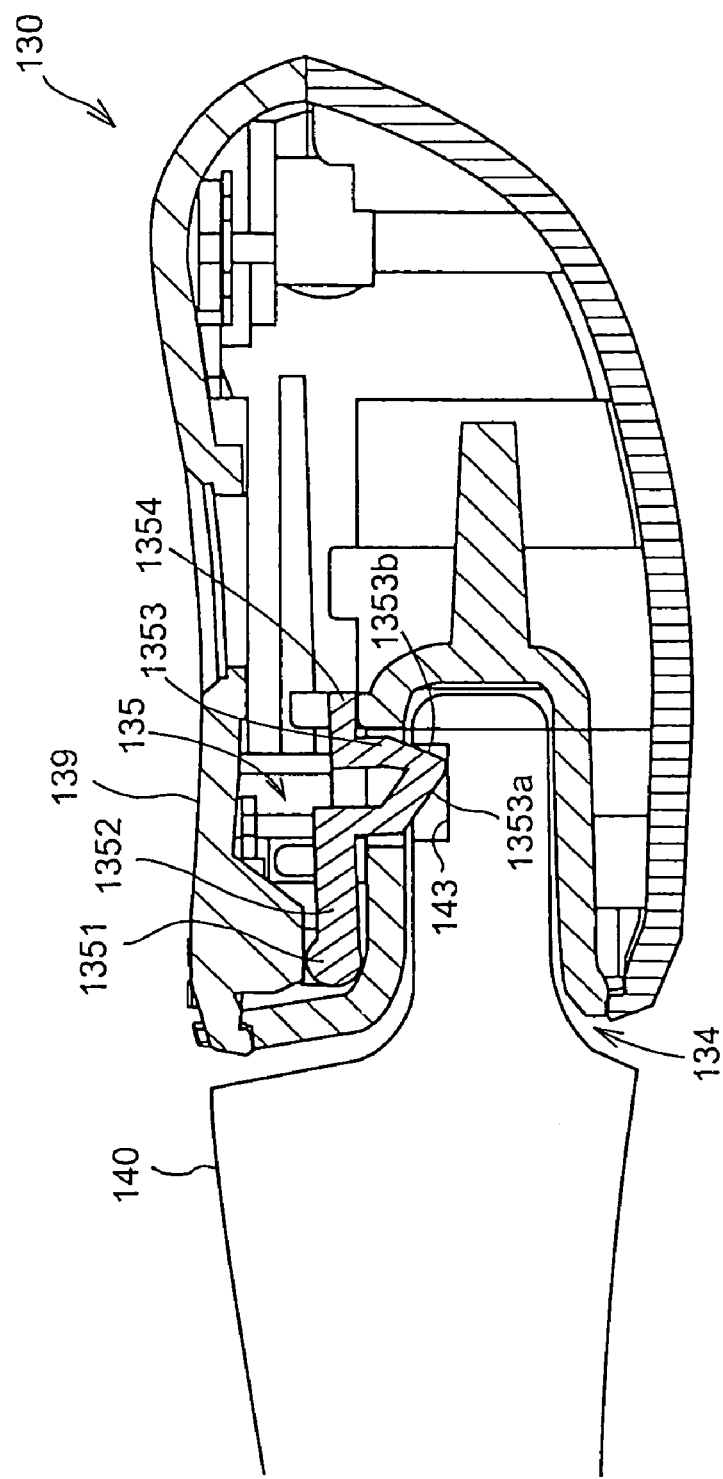
FIG. 11 is a cross-sectional view of the keyboard taken in the attachment direction when it is completely attached.

FIG. 9 is a perspective view of the hinge unit and the keyboard before being attached to the hinge unit. FIG. 10 is a cross-sectional view of the keyboard taken in the attachment direction when it is attached in partway. FIG. 11 is a cross-sectional view of the keyboard taken in the attachment direction when it is completely attached.

A cover 139 of the hinge unit 130 shown in FIG. 11 is not illustrated in FIG. 10. As shown in FIG. 11, the cover 139 is to press the shaft 1351 of the hook part 135 from above.

As shown in FIG. 9, when the keyboard 140 comes to the hinge unit in the attachment direction (direction of an arrow C) to be attached thereto, the post 138 provided in the keyboard biting slit 134 of the hinge unit 130 enters the guiding indentation 144 of the keyboard 140.

When the keyboard 140 enters the keyboard biting slit 134, as shown in FIG. 10, the tapered surface 1353a of the hook 1353 of the hook part 135 is pushed by the forefront of the keyboard 140 so that the plate 1352 of the hook part 135 bends. As a result, the hook 1353 is rotated in the direction of an arrow θ shown in FIG. 10, which enables the keyboard 140 to advance further than the hook 1353. When the keyboard 140 advances further (in the direction of the arrow C) than the position shown in FIG. 10, the engagement concave 143 of the keyboard 140 reaches the position of the hook 1353 so that the hook 1353 can enter the concave 143 by resistance to elasticity of the plate 1352 as shown in FIG. 11. The tapered surface 1353b of the hook 1353, which is positioned in the back side of the keyboard biting section 134, is extremely close to vertical. Once the hook 1353 enters the concave 143, the tapered surface 1353b will not be removed as it interferes with a sidewall of the concave 143 even when a force is applied to the keyboard 140 in the detachment direction.

Figure 12:
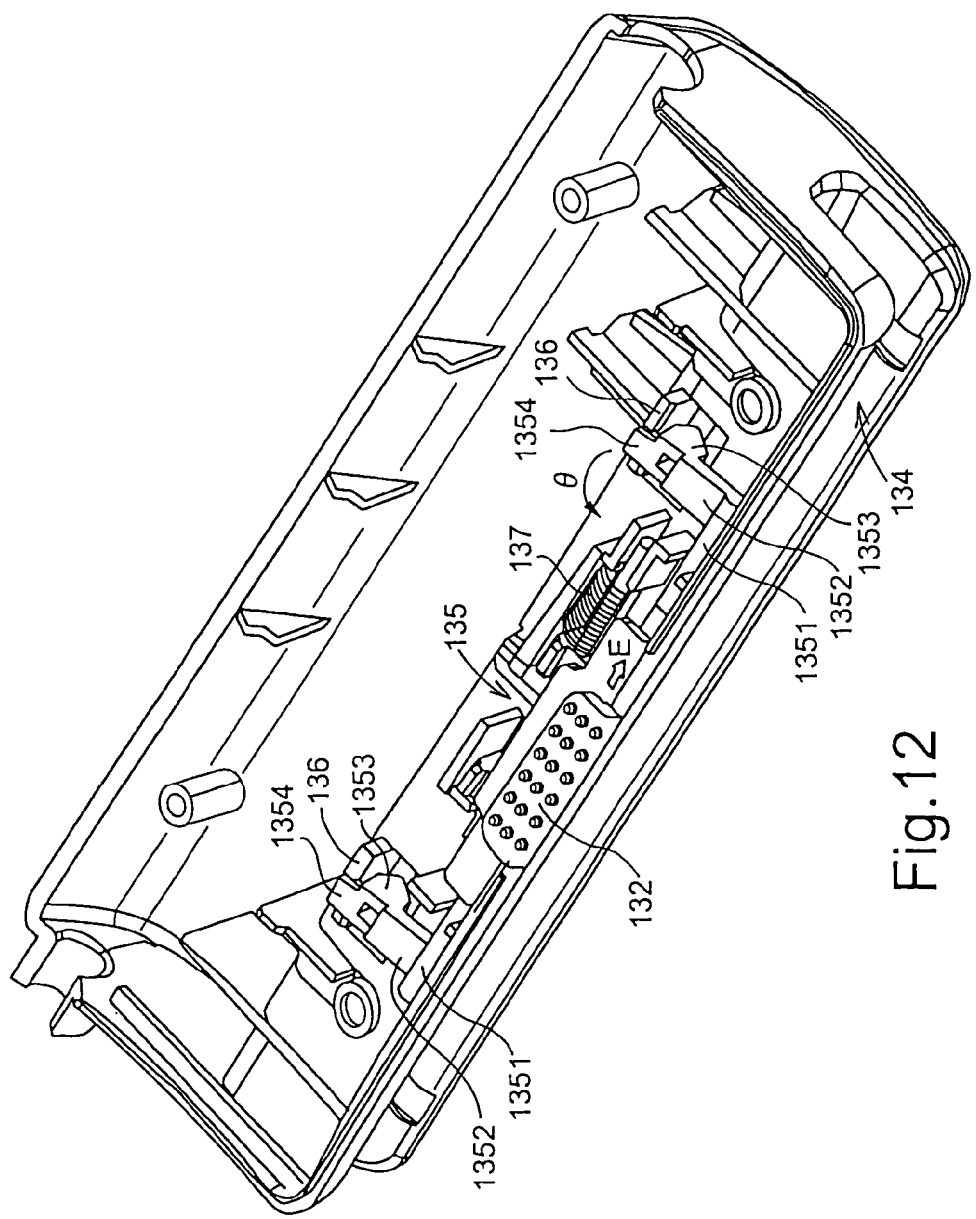
FIG. 12 illustrates the internal structure of the hinge unit to explain the motion when the keyboard is detached from the hinge unit.

FIG. 12 illustrates the internal structure of the hinge unit to explain the motion when the keyboard is detached from the hinge unit.

As compared with FIG. 7, FIG. 12 shows a state in which the detachment operation button 132 is slightly shifted by a finger in the direction of an arrow E shown in FIG. 12 resisting the urging force applied by the coil spring 137. At that time, the projections 1354 of the hook part 135 interfere with and go on slopes 136a of the motion guides 136 (see FIG. 7), causing the plates 1352 to bend so that the hooks 1353 can rotate in the direction of an arrow θ together with the projections 1354. As a result, the hooks 1353 become disengaged from the engagement concaves 143 (see FIG. 6) of the keyboard 140. In this state, when the keyboard 140 is pulled from the hinge unit in the opposite direction of the attachment direction (direction of the arrow C in FIG. 9), the keyboard can be detached from the hinge unit 130.

When the finger leaves the detachment operation button 132 after the keyboard 140 is detached, the hook part 135 including the detachment operation button 132 returns to the state in which the hooks 1353 can enter the engagement concaves 143 when the keyboard 140 is attached again.

Figure 13:
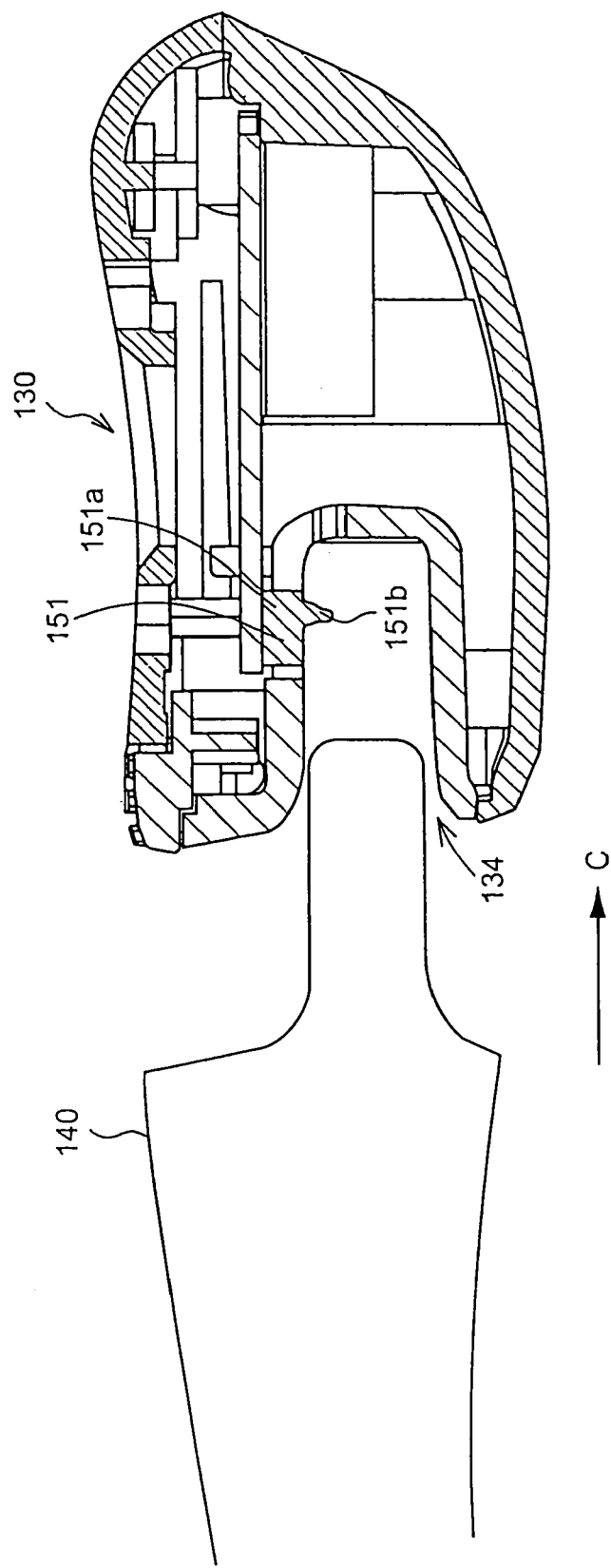
FIG. 13 is a cross-sectional view of the hinge unit taken in the keyboard attachment direction.

FIG. 13 is a cross-sectional view of the hinge unit taken in the keyboard attachment direction, which illustrates a position different from FIGS. 10 and 11.

In the space of the keyboard biting slit 134 of the hinge unit 130, there is disposed the keyboard detection switch 151 for detecting the attachment/detachment of the keyboard 140. The keyboard detection switch 151 has a main portion 151a and a protrusion 151b protruding in the course of the keyboard 140, which can retract into the main portion 151a. When the keyboard 140 is attached, the protrusion 151b is pushed by the keyboard 140 so that it retracts into the main portion 151a. The attachment of the keyboard 140 to the hinge unit 130 is detected in this manner. In contrast, when the keyboard 140 is detached from the hinge unit 130, the protrusion 151b of the keyboard detection switch 151 is urged by a spring (not shown) so that it protrudes in the space of the keyboard biting section 134 from the main unit 151a as shown in FIG. 13. The detachment of the keyboard 140 from the hinge unit 130 is detected in this manner.

Figure 14:
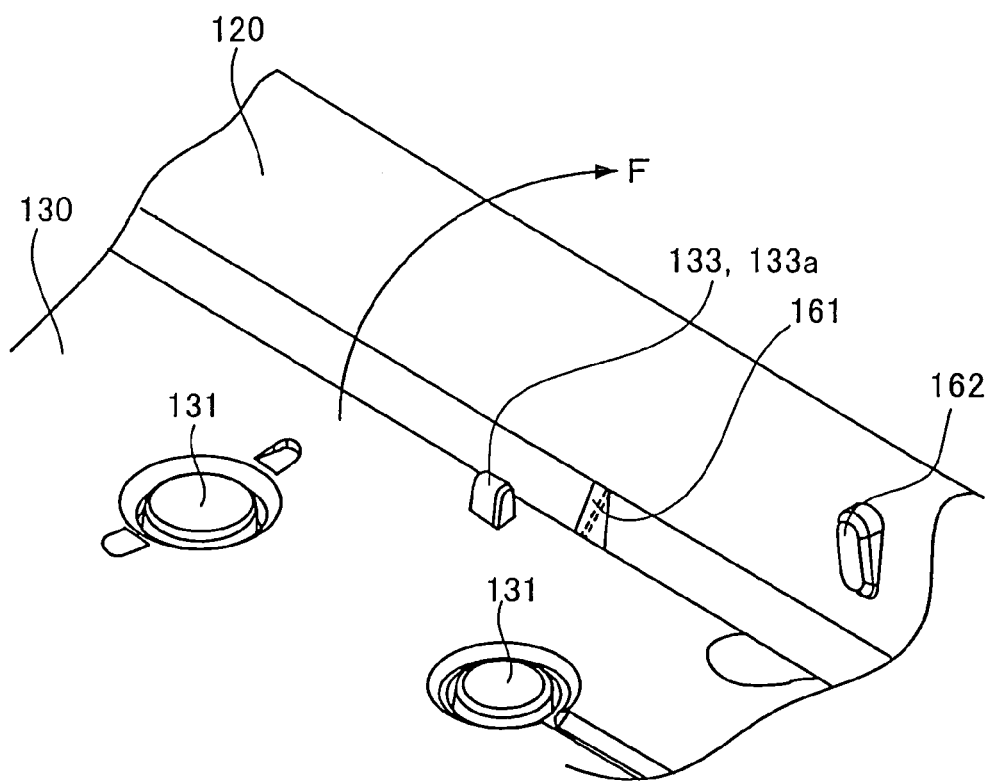
FIG. 14 is an enlarged view of a hinge-unit open/close detection switch of the integral-type PC shown in FIG. 1.

FIG. 14 is an enlarged view of the hinge-unit open/close detection switch 133 of the integral-type PC shown in FIG. 1.

The hinge-unit open/close detection switch 133 has a main portion disposed inside the hinge unit 130 and a protrusion 133a that protrudes from the surface of the hinge unit as it is urged by a spring member (not shown). When the hinge unit 130 is rotated in the direction of an arrow F shown in FIG. 14 to be changed from the open position shown in FIG. 1 to the closed position shown in FIG. 2, the protrusion 133a of the hinge-unit open/close detection switch 133 abuts a convex portion 161 of the standing section 120 and retracts into the hinge unit 130. The state in which the hinge unit 130 is in a closed position is detected in this way. In contrast, when the hinge unit 130 is opened to be changed from the closed position shown in FIG. 2 to the open position shown in FIG. 1, the protrusion 133a of the hinge-unit open/close detection switch 133 protrudes from the surface of the hinge unit 130. The state in which the hinge unit 130 is in an open position is detected in this way.

FIG. 15 is a circuit block diagram of the integral-type PC 100 according to the embodiment that has been described so far.

A main unit 200 shown in FIG. 15 corresponds to a portion obtained by combining the base section 110 and the standing section 120 shown in FIG. 1, and the main unit 200 includes a CPU 201, a RAM 202, a memory card controller 203, an audio controller 204, a TV tuner 205, a memory card 206, a liquid crystal display 207, a ROM 208, a modem card 209, a LAN controller 210, and a disk controller 211. The main unit 200 also includes the infrared receiver 128, the connector terminal 125 in conformity with IEEE 1394 standard, and the connector terminal 126 in conformity with USB standard also shown in FIG. 1, which are interconnected via a bus 220.

The CPU 201 is an element that performs various kinds of data processing by executing programs.

The RAM 202 is a memory in which programs executed at the CPU 201 are expanded for execution and which is used as a working memory during the execution of the programs in the CPU 201.

The memory card controller 203 is a controller that has access to the memory card 206.

The audio controller 204 is connected to a headphone output terminal 123, a microphone input terminal 124, and a speaker 127. The audio controller 204 serves to convert audio signals inputted from the microphone input terminal 124 into digital signals and incorporate the digital signals into the interior, and also serves to convert digital signals sent via the bus 220 into analog audio signals to send the analog audio signals to the speaker 127 and the headphone output terminal 123.

As described above, the infrared receiver 128 receives operating information of the keyboard 140 and the mouse 150.

The TV tuner 205 is connected to the antenna input terminal 112, the audio input terminals 113R and 113L, the S video input terminal 114 and the video input terminal 115 and serves as an element which performs TV broadcasting, video picture recording, playing back, etc.

The memory card 206 is a portable memory card capable of being removably inserted into this integral-type PC, for example, a memory stick, an SD memory card, etc. The memory card 206 can be accessed by the memory card controller 203.

The liquid crystal display (LCD) 207 has the liquid crystal display screen 121 shown in FIG. 1 and serves to display various images on the liquid crystal display screen 121 according to instructions of the CPU 201.

The ROM 208 is a storage element that stores fixed data and programs.

The modem card 209 is an element that performs a kind of communication and is connected to a communication connector 216.

Also, the LAN controller 210 is an element that performs a kind of communication and is connected to a communication connector 217.

Further, the disk controller 211 serves to access a hard disk 212 housed in the main unit 200 and a CD or DVD 213 loaded from the CD/DVD loading slot 122 shown in FIG. 1.

Furthermore, an AC adapter 310 includes an AC/DC converter 312 converting an AC current into a DC current and a plug socket 311 and is inserted into the AC adapter connection terminal 111. The main unit 200 also includes a battery pack 214 and a DC/DC converter 215. When the AC adapter 310 is inserted into the AC adapter connection terminal 111 and power is supplied from the AC adapter 310, the battery pack 214 is charged with the supplied power and the DC/DC converter 215 generates DC power of multiple voltages from the supplied power and supplies the DC power to components of this integral-type PC which require power. When the supply of power from the AC adapter input terminal 111 is stopped, for example, when the AC adapter 310 is removed from the AC adapter connection terminal 111, the DC/DC converter 215 is supplied with power from the battery pack 214. Therefore, this integral-type PC can work even without the AC adapter while power remains in the battery pack 214.

Well-known techniques used in notebook PCs can be applied to switching between power supply from the AC adapter 310 and that from the battery pack 214 and to controlling of the charging of the battery back 214. Therefore, the description thereof will be omitted.

In the hinge unit 130 shown in the lower part of FIG. 15, a hinge unit circuit board 231 connected to the bus 220 is shown in addition to the one-touch button 131, the hinge unit open/close detection switch 133 and the keyboard detection switch 151 described above. This hinge unit circuit board 231 serves to operate the one-touch button 131 and to detect the on/off condition of the hinge unit open/close switch 133 and the keyboard detection switch 151 and transmit the result of the detection to the CPU 201.

Figure 16:
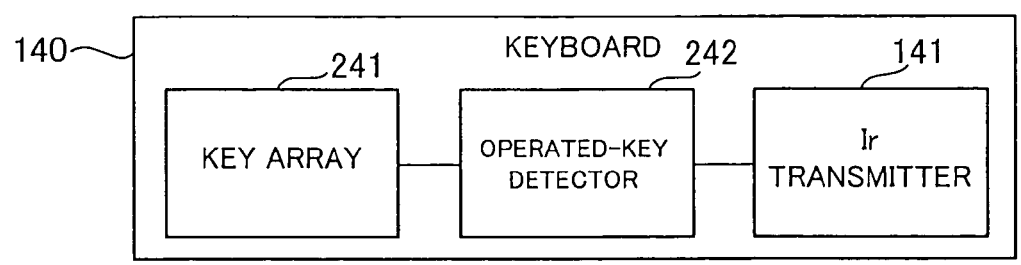
FIG. 16 is a circuit block diagram of the keyboard.

FIG. 16 is a circuit block diagram of the keyboard.

The keyboard 140 includes a key array 241 composed of many arrayed keys, an operated-key detector 242 which detects operations made on the key array 241, and an infrared transmitter 141 which sends key operation information detected by the operated-key detector 242. As described earlier, the key operation information sent from the infrared transmitter 141 is received by the infrared receiver 128 (refer to FIG. 15) of the main unit 200 and transmitted to the CPU 201.

Figure 17:
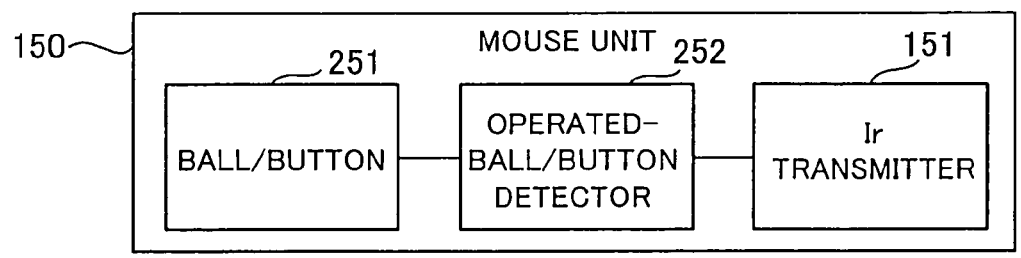
FIG. 17 is a circuit block diagram of a mouse.

FIG. 17 is a circuit block diagram of the mouse.

The mouse 150 includes a ball/button 215 as an operating member, and the operation of the ball and the button is detected by an operated-ball/button detector 252, and mouse operation information detected by the operated-ball/button detector 252 is sent from the infrared transmitter 151. As described earlier, the mouse operation information sent from the infrared transmitter 151 is received by the infrared receiver 128 of the main unit 200 (refer to FIG. 15) and transmitted to the CPU 201.

Figure 18:
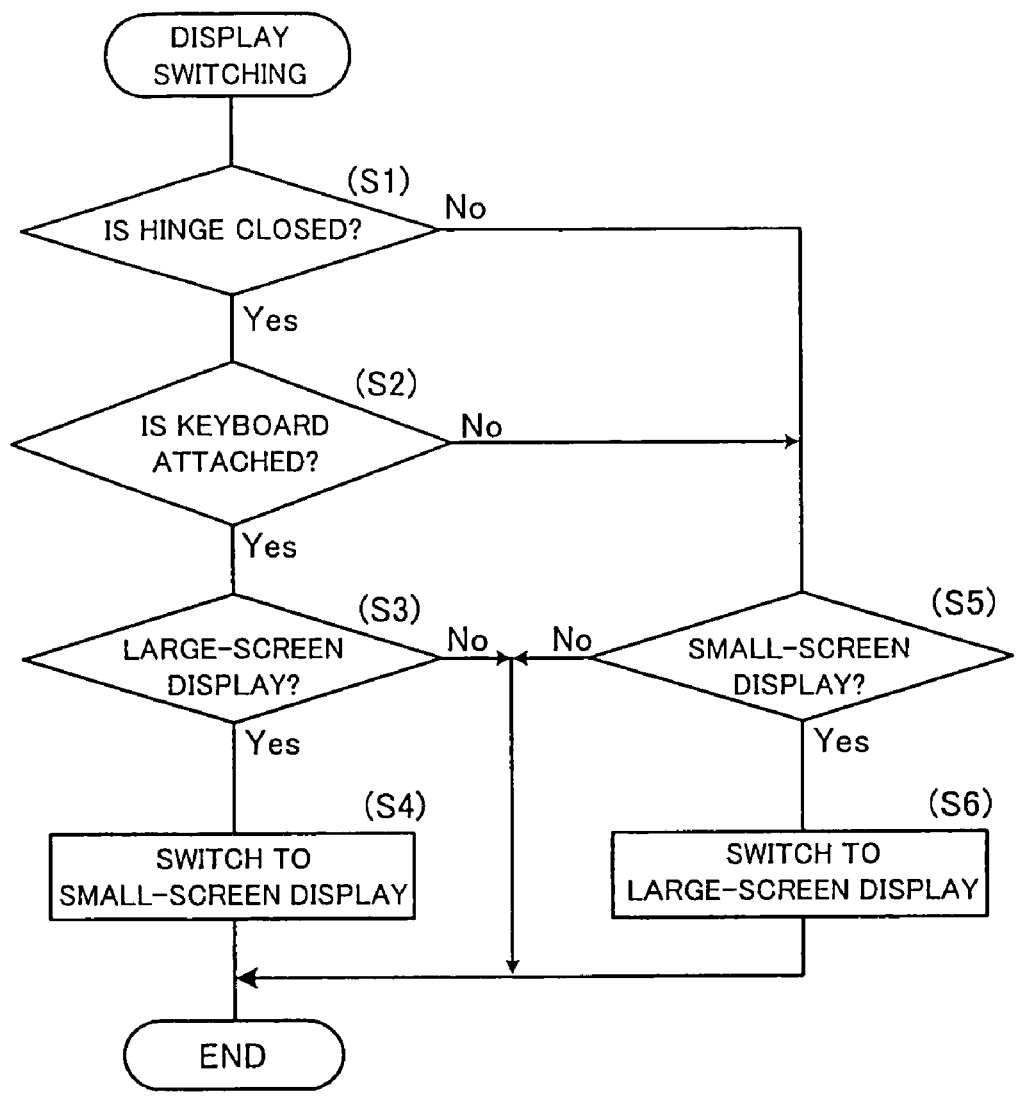
FIG. 18 is a flowchart showing a display switching routine.

FIG. 18 is a flowchart showing a display switching routine.

The display switching routine is an interrupt handled by the CPU 201 of the main unit 200 when the hinge unit circuit board 231 shown in FIG. 15 changes either the hinge-unit open/close detection switch 133 or the keyboard detection switch 151 from ON to OFF or from OFF to ON.

When the display switching routine shown in FIG. 18 is activated, it is determined whether the hinge unit 130 is closed or not (step S1) and whether the keyboard 140 is attached to the hinge unit 130 or not (step S2). If the hinge unit 130 is closed and the keyboard 140 is attached to the closed hinge unit 130—i.e. if they are in the position shown in FIG. 2, the flow goes to step S3 where it is determined whether a large-screen display mode using the whole area of the liquid crystal display screen 121 is currently set or not. If the large-screen display mode is currently set, the mode is changed to a small-screen display mode for displaying a clock etc. on only an upper part of the screen which is not covered by the keyboard 140 in the position shown in FIG. 2 (step S4).

Also, when it is determined that the hinge unit 130 is not closed or that the keyboard 140 is not attached to the hinge unit 130 even when the hinge unit 130 is closed, the whole area of the liquid crystal display screen 121 can be seen and thus the flow goes to step S5. At step S5, it is determined whether the small-screen display mode is currently set or not. If the small-screen display mode is currently set, the mode is changed to the large-screen display mode.

In this manner, the display mode is appropriately switched depending on the ON/OFF state of the hinge-unit open/close detection switch 133 and the keyboard detection switch 151.

This concludes the description of the integral-type PC as an embodiment. Subsequently, modifications will be described only with respect to the points different from the above-described embodiment.

In the above embodiment, the state in which the hinge unit 130 is removed from the standing section 120 is shown in FIG. 4, which does not mean that the hinge unit 130 in normal use can be removed from the standing section 120. This is to show the supporting shaft 129 that supports the hinge unit 130 to enable the free rotation of the hinge unit 130.

However, a modification of the above embodiment may be configured such that the hinge unit 130 can also be removably attached to the standing section 120 and may also include an infrared transmitter similarly to the keyboard 140 and the mouse 150. In such a configuration, when the one-touch button 131 of the hinge unit 130 is operated, the operation information is sent from this infrared transmitter to the infrared receiver 128 that transmits in turn the received information to the CPU 201 to enable the CPU 201 to perform processing according to the operation made on the one-touch button 131.

Further, although infrared is used to send the key operation information of the keyboard 140 to the main unit 200 in the above-described embodiment, other types of wireless communications systems may be employed. Furthermore, instead of wireless communications, wire communications may be employed to transmit key operation information by connecting the keyboard 140 to the main unit 200 with cables.

Figure 19:
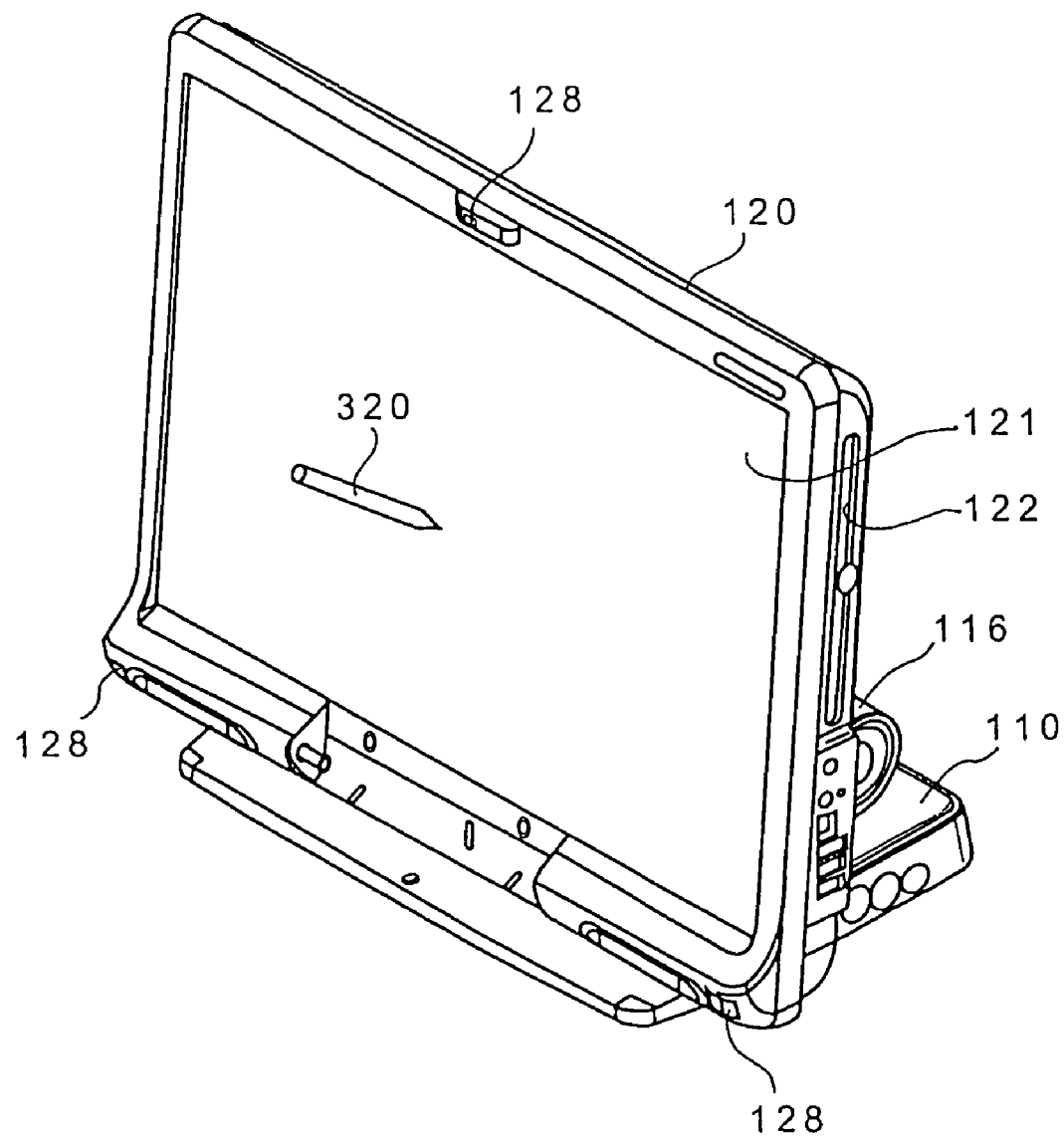
FIG. 19 is a perspective view of the integral-type PC with a base section and a standing section from which the hinge unit is removed.

FIG. 19 is a perspective view of the integral-type PC 100 with the base section 110 and the standing section 120 from which the hinge unit is removed.

FIG. 19 also shows a touch pen 320. In this way, the touch pen may be provided and instructions may be given to the integral-type PC by touching the screen with the touch pen 320 even when the keyboard and the hinge unit are both detached therefrom.

In the above description, integral-type PCs have been used as an example. However, the present invention is not limited to integral-type PCs and can be applied to various types of electronic apparatus configured to be folded via hinge.

The invention claimed is:

1. An electronic apparatus comprising:
a first enclosure having a circuit component;
a hinge unit rotatably connected to the first enclosure via a hinge; and
a second enclosure having a circuit component and connected to the first enclosure via the hinge unit, wherein the hinge unit has a circuit component;
wherein the first enclosure includes a display section having a display screen for displaying an image, and the second enclosure is a keyboard having arrayed keys to be operated by an operator;
wherein the keyboard is detachably attached to the hinge unit, and
wherein the hinge unit is rotatable between a closed position in which the keyboard is superposed on the display screen and an open position in which the keyboard is opened with respect to the display screen.

2. The electronic apparatus according to claim 1, wherein the hinge unit includes a circuit board having a circuit component thereon.

3. The electronic apparatus according to claim 1, wherein the hinge unit includes an operation member as a circuit component.

4. The electronic apparatus according to claim 3, wherein the keyboard includes a wireless communication section for wirelessly communicating with the display section.

5. The electronic apparatus according to claim 1, further comprising a first detection section that detects opening and closing of the hinge unit.

6. The electronic apparatus according to claim 1, further comprising a second detection section that detects attachment and detachment of the keyboard to and from the hinge unit.

7. The electronic apparatus according to claim 1, wherein the keyboard is detachably attached to the hinge unit and covers a part of the display screen when the hinge unit is in a closed position, and the electronic apparatus further comprises:
a first detection section that detects opening and closing of the hinge unit;
a second detection section that detects attachment and detachment of the keyboard to and from the hinge unit; and
a display control section that changes display contents by changing between an open-screen state in which the hinge unit is in an open position or the keyboard is detached from the hinge unit, and a covered-screen state in which the keyboard is attached to the hinge unit and the hinge unit is in a closed position.

8. The electronic apparatus according to claim 1, wherein the first enclosure is a main unit that performs data processing according to an operation made on the keyboard.

9. The electronic apparatus according to claim 8, wherein the hinge unit is rotatable between a closed position in which the keyboard is superposed on the main unit and an open position in which the keyboard is opened with respect to the main unit.

10. The electronic apparatus according to claim 9, further comprising a first detection section that detects opening and closing of the hinge unit.

11. The electronic apparatus according to claim 8, wherein the keyboard includes a wireless communication section for wirelessly communicating with the display section.

* * * * *